United States Patent
Derrickson, Jr. et al.

[15] 3,669,488
[45] June 13, 1972

[54] FOLD-DOWN SEAT MECHANISM FOR VEHICLES

[72] Inventors: Charles Derrickson, Jr.; Robert A. Rodgers, both of Fort Wayne, Ind.

[73] Assignee: International Harvester Company, Chicago, Ill.

[22] Filed: Aug. 21, 1970

[21] Appl. No.: 65,838

[52] U.S. Cl..................................296/66, 297/63
[51] Int. Cl..........................................B60n 1/10
[58] Field of Search............296/65, 66, 69; 297/63, 64, 297/105, 331, 333, 341

[56] References Cited

UNITED STATES PATENTS

| 3,171,684 | 3/1965 | Carte | 296/65 X |
| 2,987,344 | 6/1961 | Hershey | 296/66 |
| 3,333,885 | 8/1967 | Franke et al. | 296/66 |
| 3,113,801 | 12/1963 | Caley | 296/66 |
| 3,198,573 | 8/1965 | Betts | 296/69 |

*Primary Examiner*—Benjamin Hersh
*Assistant Examiner*—Leslie J. Paperner
*Attorney*—Floyd B. Harman

[57] ABSTRACT

A folding seat mechanism for vehicles such as station wagons and panel trucks wherein a passenger seat is folded down so that the backs of both the seat back and seat cushion provide additional cargo carrying space. The mechanism includes torsion bars connected to bias the seat back into an upright position and a linkage mechanism joining the seat back and cushion and effective to transmit the folding motion of one into the folding motion of the other. The mechanism also includes latching mechanisms effective to hold the seat back and cushion in either an upright position or in a completely fold-down position, and suitable built-in load carrying supports.

16 Claims, 7 Drawing Figures

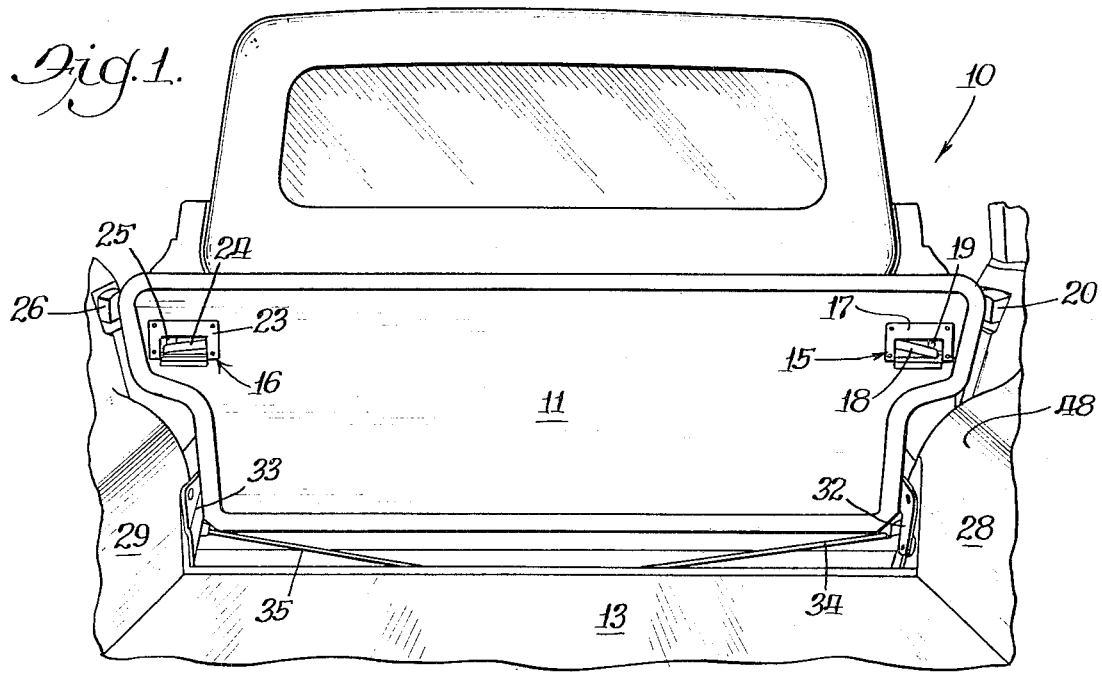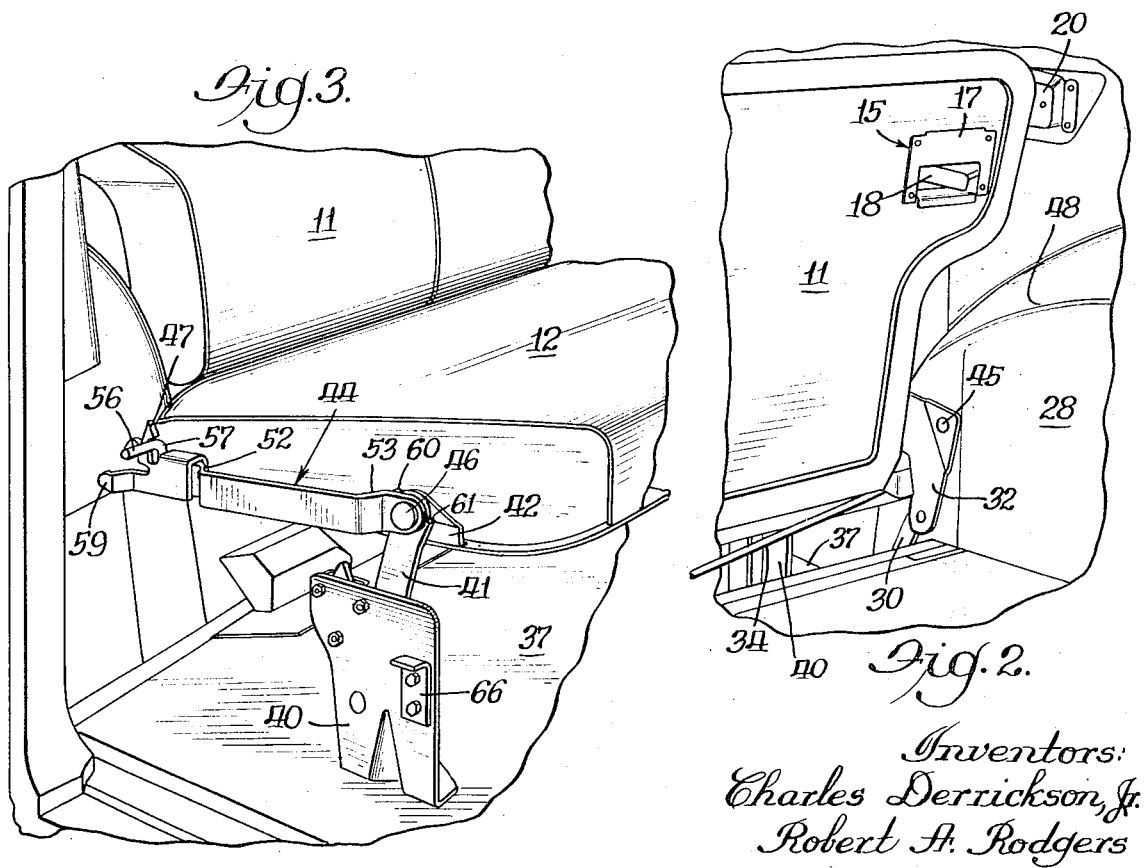

Inventors:
Charles Derrickson, Jr.
Robert A. Rodgers
By Frederick J. ——
Attorney

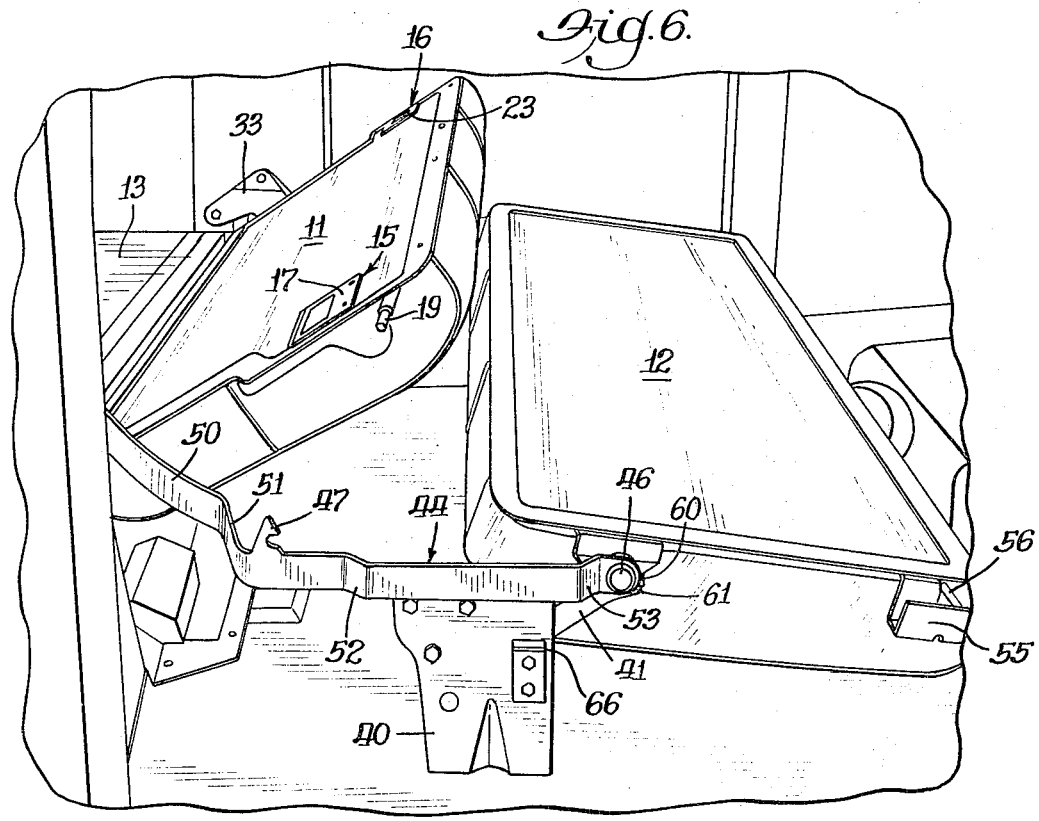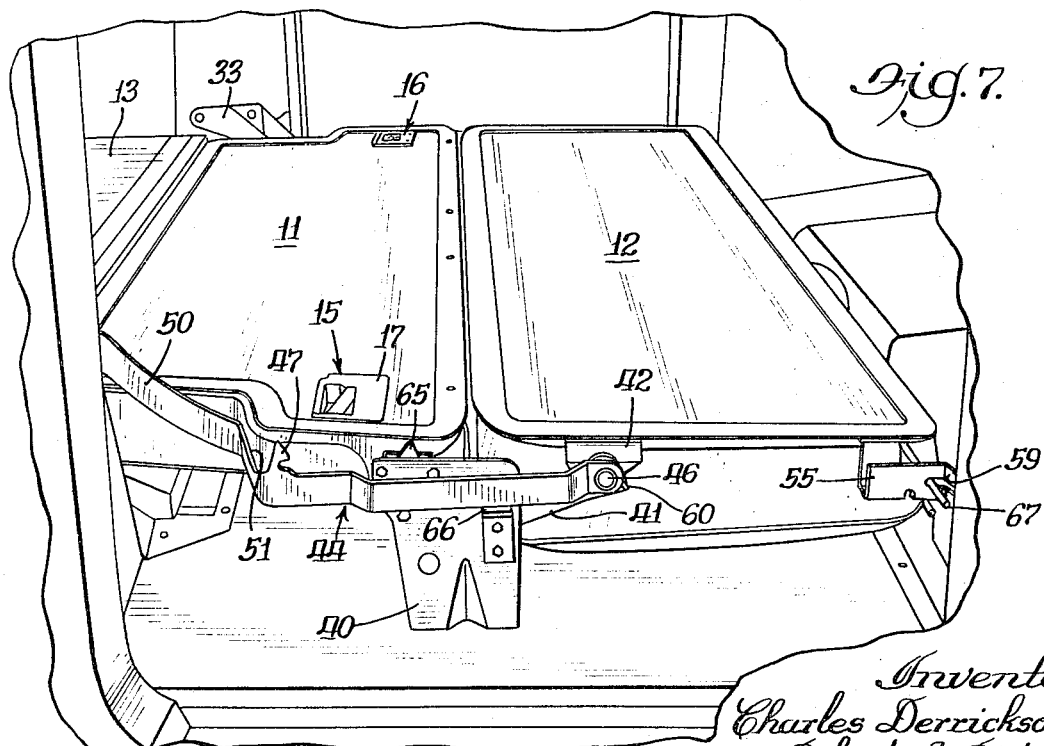

FOLD-DOWN SEAT MECHANISM FOR VEHICLES

BACKGROUND OF THE INVENTION

This invention relates to vehicle seats and more particularly to passenger seats of the fold-down variety that are convertible into cargo-carrying space.

In certain types of vehicles, such as station wagons and light passenger trucks, it is desirable to be able to convert the vehicle to provide additional cargo carrying space when desired.

This conversion is most easily accomplished by providing one or more rear passenger seats that fold down to provide additional cargo space. Such folding seats are well known, as much for their complexity and awkward manipulation, as for their utility.

SUMMARY OF THE INVENTION

It is an object of the present invention to provide a folding seat mechanism that is simple to operate, rugged in operation, and firmly latched in either the upright or complete fold-down positions so as to minimize noise and vibration frequently encountered in such devices.

It is another object to incorporate a resilient torsion bar mounting mechanism biased to raise the seat back and cushion toward an upright position.

It is still another object to provide a pivoted seat back and pivoted seat cushion and linkage mechanism interconnecting the back and cushion and effective to move said back and seat simultaneously throughout a portion of their pivoting motion.

BRIEF DESCRIPTION OF THE DRAWINGS

FIG. 1 is a view from the rear of the fold-down seat back of the present invention showing seat back releases on either side;

FIG. 2 is a fragmentary perspective view showing one seat back release and portions of the mounting hinge and torsion bar for the seat back;

FIG. 3 shows the seat mounting mechanism in its normal and locked position;

FIG. 6 shows the seat back released and partially folded forward, and the seat cushion folded all the way down; and FIG. 7 shows both the seat cushion and seat back in a complete folded position and folded down flush with the rear deck of the vehicle.

DESCRIPTION OF THE PREFERRED EMBODIMENT

Figure 4:
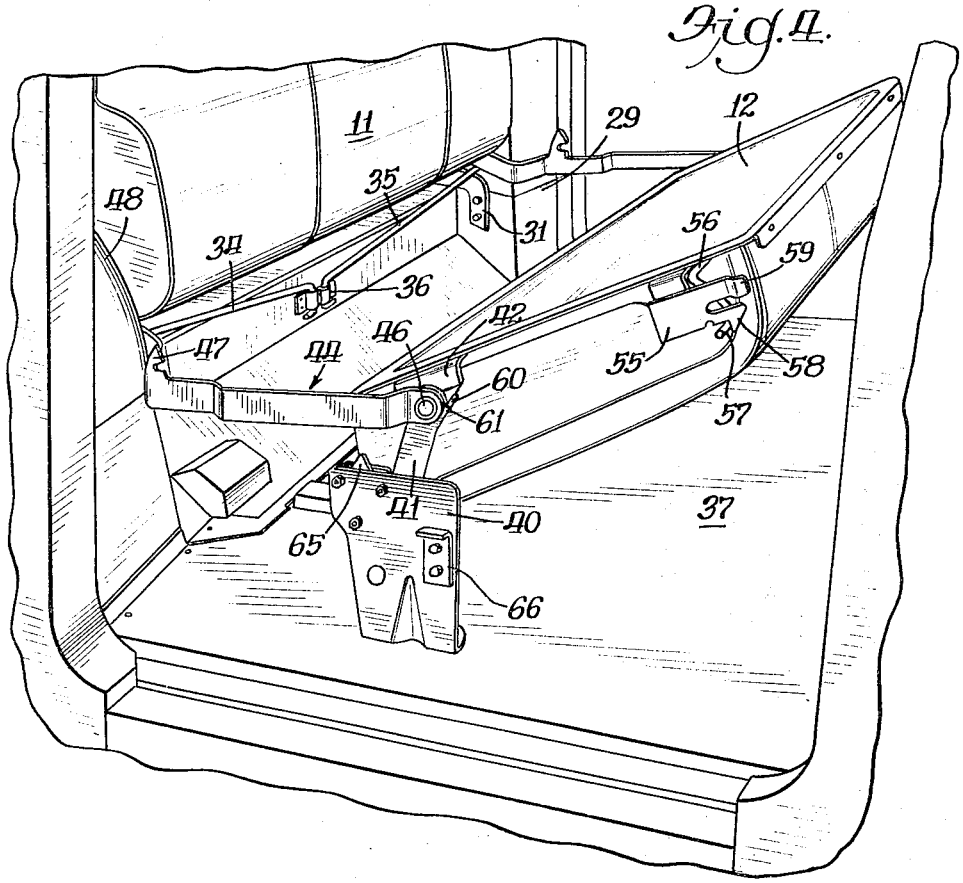
FIG. 4 shows the seat cushion in its first stage of folding partially folded forward to a limit of motion until the seat back is released.
Figure 5:
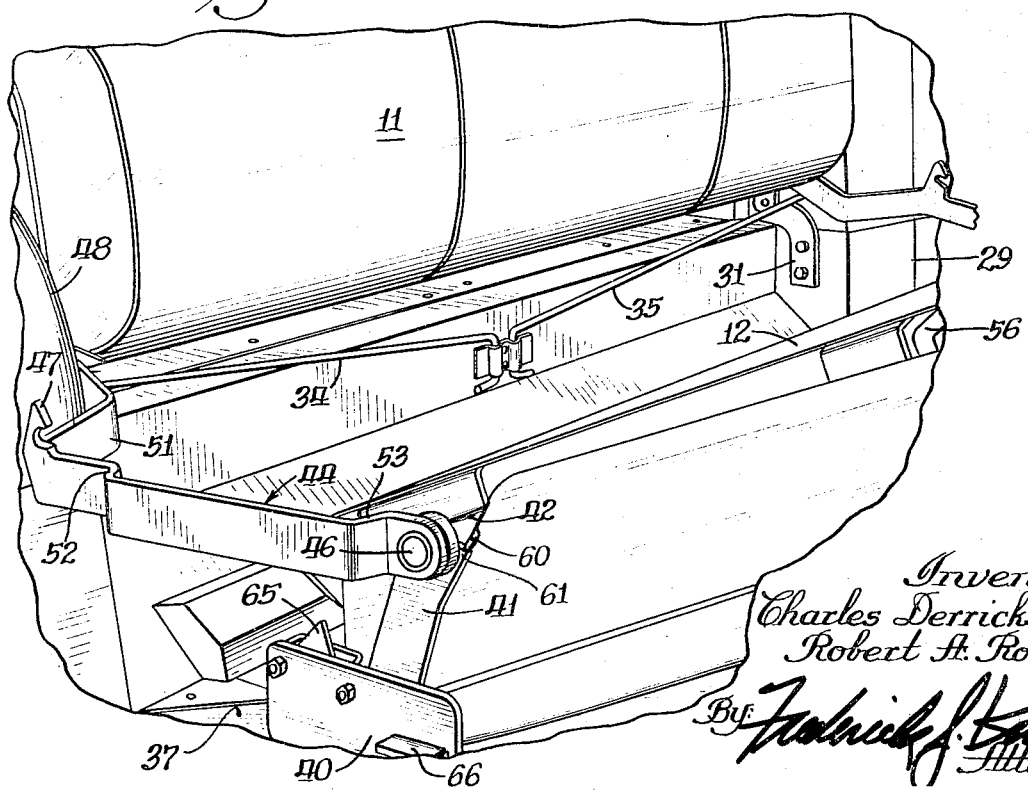
FIG. 5 shows two torsion bars mounted to bias the seat back toward an upright position.

The fold-down seat mechanism of the present invention is designated generally by the numeral 10 and includes a seat back 11 and seat cushion 12, both of which fold forwardly so that their backs form an extension of the interior rear deck 13 of a vehicle.

The seat back 11 carries two release latches 15 and 16 located on opposite sides of the back 11. The latch 15 comprises a recessed finger well 17, a spring loaded handle 18 pivotally mounted within the well 17 and connected to actuate a latching bar 19. When the seat back 11 is upright, in the position shown in FIGS. 1 and 2, the latching bar 19 is engaged by a latch 20 mounted on the interior wall of the vehicle. Similarly, the release latch 16 comprises a recessed well 23, a handle 24, and latching bar 25 adapted to be engaged by a wall mounted latch 26.

The seat back 11 is mounted on the interior walls 28 and 29 of the vehicle by a pair of brackets 30 and 31 bolted or welded to the respective wall. A pair of mounting brackets 32 and 33 are rigidly attached to the seat back 11 and are pivotally mounted on the brackets 30 and 31, respectively. A pair of torsion bars 34 and 35 each have an outermost end attached to the brackets 32 and 33, respectively. The innermost ends of the bars 34 and 35 are anchored to the vehicle body by a common clamp 36. The bars 34 and 35 are mounted under initial torsion and tend to bias the seat back 11 toward the upright position.

Referring now to FIG. 3, the seat cushion 12 is seen to be pivotally supported by a stanchion 40 attached to the floor 37 of the vehicle and a link 41 pivotally attached to the stanchion 40 by pivotal connection 41a and to a bracket 42 rigidly attached to the outer edge of the seat cushion 12. A corresponding stanchion, link and bracket are provided on the opposite side of the seat cushion 12, but are not shown in the figures.

An elongated connecting link or bar 44 joins the link 32 on the seat back 11 to the bracket 42 on the seat cushion 12. The link 44 is pivotally attached to the link 32 by means of a pin 45 and to the bracket 42 by means of a pivot pin 46. An upwardly extending notched prong 47 is formed integrally with the bar 44 for retaining the seat cushion 12 in its normal position for use as a seat. (A corresponding link and attachments are provided for the opposite side of the seat but are not described here in detail.)

The link 44 curves downwardly at 50 so that most of the linkage and mounting brackets are disposed below the deck level 13 when the seat mechanism 10 is completely folded down. The bar 44 curves outwardly at 51 so as to clear the wheel well 48 in the upright position, and to clear the curved portion 49 of the seat back 11 in the down position. The link 44 is also curved outwardly at 52 and inwardly at 53 so that the link 44 clears the top of the stanchion 40 when completely folded down.

A U-shaped channel bracket 55 is rigidly attached to the seat cushion 12 and is adapted to extend over a central portion of the link 44 when the seat cushion 12 is in its normal position as best seen in FIG. 3. A latching rod 56 extends through and across the entire width of the seat cushion 12 and is torsionally biased toward contact with the channel bracket 55. The ends of the rod 56 are formed into the shape of a crank at 57 to provide limited angular rotation of the rod 56. The outer leg of U-shaped bracket 55 is bifurcated to form two stops 58 and 59. The stop 58 limits the angular motion of the rod 56, and the stop 59 provides a rest for the seat cushion 12 in the fold-down position. When the seat cushion 12 is in the upright position, the crank end 57 of the rod 56 engages the notched prong 47 and is held in this position until it is manually released.

The bracket 42 is formed with a flange stop 60 which is adapted to contact a notched shoulder 61 formed on the link 41. The stop 60 limits the angular rotation of the seat cushion 12 about the pin 46 when it is folded forward.

The stanchion 40 carries a latching prong 65 on the upper end thereof for locking with the rod 19 on the seat back 11 when the latter is folded down. The stanchion 40 also carries a support flange 66 adapted to be contacted by the link 44 to support weight that might be placed on the backs of the seat 11 and cushion 12 in the fold-down position.

The operation of the fold-down seat mechanism 10 will now be described:

In the normal position for carrying passengers, the seat back 11 and cushion 12 are in the positions shown in FIGS. 1, 2, and 3. The seat mechanism 10 is converted to the cargo carrying position, shown in FIG. 8, by first releasing manually the rod 56 from engagement with the prong 47. The seat cushion 12 is then rotated forwardly about the axis defined by the pin 46 until the flange 60 engages the shoulder 61, as shown in FIG. 4. This is the limit of motion for the cushion 12 until the seat back 11 is released.

The seat back 11 is released by unlatching the latches 15 and 16. The seat back 11 is then folded forwardly against the torsion of the bars 34 and 35. The forward folding motion of the seat back 11 is transmitted through the bracket 32 and link 44, allowing the cushion 12 to fold forwardly at the same time by means of forward pivotal movement of the link 41 until the stop 59 engages a suitable support. Initially, the forward edge of the cushion 12 folds below the horizontal position, as shown in FIG. 6, allowing the fork defined by the stops 58 and 59 to engage a pin 67 mounted on the floor of the vehicle or on a door pillar. Continued forward motion of the seat back 11 causes the rod 19 to engage the latch 65, and the link 44 comes to rest on the support flange 66. The back edge of the seat cushion 12 is depressed along with the seat back 11 until it is flush with the horizontal and with the rear deck 13. This latter motion also effectively locks the seat cushion 12 to the pin 67 to prevent vibration and noise from being generated by motion of the cushion 12. Similarly, the engagement of rod 19 with latch 65 effectively locks the seat back 11.

The seat mechanism 10 is raised into the upright position by first releasing the latches 15 and 16. The torsion in the bars 34 and 35 tend to raise the seat back 11 and swing it back to the upright position. The rearward arcuate motion of the back 11 is transmitted through the link 44, picking up the seat cushion 12, first by the rear to release pin 67, and then raising it to the position shown in FIG. 4. The bars 19 and 25 engage the latches 20 and 26, respectively, and the seat back 11 is thus locked in the upright position. The seat cushion 12 is merely flipped the rest of the way back and the rod 56 engages the latching prong 47. The entire seat mechanism 10 is then again in the passenger carrying position.

It is to be understood that the linkage and latching mechanisms shown and described exist on both sides of the seat mechanism, and are only described where clearly visible.

The embodiment shown and described is by way of example only and the invention is not to be considered as limited thereto except insofar as the claims may be so limited. It is to be understood that many changes may be made thereto without departing from the spirit of the invention.

I claim:

1. A three-bar linkage for mounting a fold-down seat arrangement having a seat back and seat cushion in a vehicle with interior walls and floor and comprising
   a first bar pivotally attached at one end to the interior wall and rigidly attached at the other end to said seat back;
   a second bar pivotally attached at one end to the floor and pivotally attached at the other to said seat cushion;
   a third bar pivotally connected to said first and second bars;
   stop means attached to said seat cushion and engageable by said second bar and effective to limit pivotal folding motion of said seat cushion; and
   interconnecting means effective to cause the pivotal motion of said first bar to be transmitted through said third bar so as to cause further folding motion of said seat cushion integrally with said second bar.

2. A folding seat mechanism for a vehicle having an interior floor and side walks comprising;
   a seat back;
   a seat cushion;
   a first pivotal mounting linkage attached to the side walls and supporting said seat back;
   a second pivotal mounting linkage attached to the floor and supporting said seat cushion;
   a third connecting linkage operatively connecting said first and second mounting linkages;
   stop means incorporated in said second linkage and effective to limit the pivotal forward folding motion of said seat cushion;
   said seat cushion has defined a forward leading edge when said cushion is folded forwardly to the limit of motion permitted by said stop means;
   engageable latch means mounted on said seat cushion adjacent said leading edge; and
   mating latch means mounted on the vehicle and engageable by said last named latch means.

3. The folding seat mechanism of claim 2 wherein release and forward folding motion of said seat back is transmitted through said third connecting linkage to said seat cushion to cause further forward folding motion thereof.

4. The folding seat mechanism of claim 3 wherein said second and third pivotal mounting linkages constrain said seat cushion to fold forwardly so that said leading edge of said seat cushion drops initially below a horizontal plane so as to permit the engagement of said engageable and mating latch means; and
   further forward folding motion of said seat back effectively drops the backs of said seat back and cushion to a common horizontal plane and effectively locks said engageable and mating latch means to minimize vibrational motion of said seat cushion.

5. A folding seat mechanism for a vehicle having an interior floor and side walls comprising;
   a seat back;
   a seat cushion;
   a first pivotal mounting linkage attached to the side walls and supporting said seat back;
   a second pivotal mounting linkage attached to the floor and supporting said seat cushion;
   a third connecting linkage operatively connecting said first and second mounting linkages;
   stop means incorporated in said second linkage and effective to limit the pivotal forward folding motion of said seat cushion;
   releasable latch means associated with said seat back and effective to latch firmly said seat back to the side walls in an upright position;
   a floor mounted stanchion for mounting said second pivotal linkage; and
   additional latch means also mounted on said stanchion and engageable by said releasable latch means on said seat back to latch said seat back firmly in a completely fold-down position.

6. The folding seat mechanism of claim 5 including a load bearing flange mounted on said stanchion and engageable by said third connecting linkage so as to provide a load bearing support for loads carried on the backs of said seat cushion and seat back in the fold-down position.

7. In a vehicle body, a folding seat structure, comprising,
   a generally transversely extending seat back;
   means pivotally connecting said seat back to the vehicle body whereby said seat back is swingable between an upright position and a generally horizontal lowered position about a fixed, transversely extending axis;
   a generally transversely extending seat cushion;
   means operatively connecting said seat cushion to the vehicle body whereby said seat cushion is movable between a normal position wherein one lateral edge thereof is adjacent the lateral edge of said seat back which is lowermost when in its upright position and one side thereof is facing generally upwardly and an extended, folded-down position wherein said one lateral edge thereof is horizontally spaced from said lateral edge of said seat back which is lowermost when in its upright position and the side opposite said one side of said seat cushion is facing generally upwardly, said means including a first link having one end pivotally connected to said seat cushion and its opposite end pivotally connected to a part stationary with respect to the vehicle body, said movement of said seat cushion between its normal and folded-down positions being effected by relative pivotal movement between said seat cushion and said first link and between said first link and said part stationary with respect to the vehicle body; and
   linkage means operatively interconnecting said seat back and said first link whereby said first link is constrained to pivot in respect to said part stationary with respect to the vehicle body only in unison with said seat back as said seat back is swung between its upright and lowered positions.

8. A folding seat structure as set forth in claim 7, including stop means carried by said seat cushion and engageable with said first link during movement of said seat cushion from its normal position toward its folded-down position, said stop means being effective to limit relative pivotal movement permitted between said seat cushion and said first link during such movement of said seat cushion from its normal position to its lowered position.

9. A folding seat structure as set forth in claim 8, including releasable latch means associated with said seat back, the vehicle body, and said part stationary with respect to the vehicle body, said latch means being operable to firmly latch said seat back to the vehicle body when in its upright position and to said part stationary with respect to the vehicle body when in its lowered position.

10. A folding seat structure as set forth in claim 9, including torsion spring means operatively connected to the vehicle body and said seat back, said torsion spring means being effective to continually bias said seat back toward its upright position, said spring means includes a pair of torsion bars, each of said torsion bars extending transversely in opposite directions from a mid-point of the vehicle body, the innermost end of each torsion bar being firmly secured to the vehicle body by a common clamp and the outermost end of each torsion bar being attached to said seat back.

11. A folding seat structure as set forth in claim 9, including additional releasable latch means associated with said seat cushion and said linkage means, said latch means being operable to firmly latch said seat cushion to said linkage means when said seat cushion is in its normal position.

12. A folding seat structure as set forth in claim 11, wherein said linkage means includes a second link having one end pivotally connected to said seat back and its opposite end pivotally connected to said first link.

13. A folding seat structure as set forth in claim 12, wherein said second link is capable of pivoting with respect to said seat back about an axis vertically spaced from the axis about which said seat back pivots as it swings between its upright and lowered positions, said second link being further capable of pivoting with respect to said first link about an axis coincident with the axis about which said seat cushion is capable of pivoting with respect to said first link as it moves between its normal and folded-down positions.

14. A folding seat structure as set forth in claim 13, including support means for said seat cushion when in its normal position, said support means including a substantially U-shaped bracket rigidly secured to said seat cushion, said bracket being formed with spaced and parallel leg portions integrally connected along respective edges by a bight portion, the leg portions of said bracket being disposed on respective opposite sides of said second link and the bight portion thereof abutting an edge portion of said second link when said seat cushion is in its normal position.

15. A folding seat structure as set forth in claim 14, including additional support and latch means for said seat cushion when in its folded-down position, said additional support and latch means including said U-shaped bracket and a transversely extending pin rigidly secured to the vehicle body, one of said leg portions of said U-shaped bracket being bifurcated, said pin being receivable in the bifurcation and engageable with the edge surfaces of said one leg portion defining the bifurcation when said seat cushion is in its folded-down position.

16. A folding seat structure as set forth in claim 15, wherein said part stationary with respect to the vehicle body is in the form of a stanchion rigidly secured to the vehicle body; and further including second support means for said seat cushion when in its folded-down position comprising a transversely projecting flange rigidly secured to said stanchion, an edge portion of said second link resting upon said flange when said seat cushion is in its folded-down position.

* * * * *